Nov. 12, 1968 M. LOPEZ-HENRIQUEZ 3,410,497

RIM DRIVEN REELS WITH SPEED CONTROL MEANS

Filed July 18, 1963

3 Sheets-Sheet 1

Nov. 12, 1968 M. LOPEZ-HENRIQUEZ 3,410,497

RIM DRIVEN REELS WITH SPEED CONTROL MEANS

Filed July 18, 1963

3 Sheets-Sheet 3

United States Patent Office 3,410,497
Patented Nov. 12, 1968

3,410,497
RIM DRIVEN REELS WITH SPEED CONTROL MEANS
Miguel Lopez-Henriquez, 240 W. 73rd St., New York, N.Y. 10023
Filed July 18, 1963, Ser. No. 295,925
3 Claims. (Cl. 242—55.13)

ABSTRACT OF THE DISCLOSURE

A tape recorder having a motor on a chassis of the recorder and a toothed driving member. A cartridge for a pair of tape-carrying reels rotatably supports the reels. Each reel has a toothed rim. The cartridge is movably mounted on the chassis for movement to a first driving position in which the toothed driving member is in driving engagement with the toothed rim of one of the reels and to a second driving position in which the driving member engages the rim of the other reel to wind tape from one reel to the other. Sensing means senses the lineal speed of the tape and a tape-speed control means respond to the sensing means for controlling the speed of the motor to drive the reel engaging the driving toothed member at an angular speed to provide a selected lineal tape speed.

The present invention relates to tape recorders, the term "tape recorder," being used in a generic sense to designate equipment for "playing back" tape recordings as well as equipment for making such recordings.

It is an object of the invention to provide a self-contained tape recorder of such small size that it can easily be carried in the pocket. For example, a tape recorder in accordance with the invention may be of approximately the same size as a pack of cigarettes.

A further object of the invention is to provide a small tape recorder that is convenient to use. Tape is supplied in a form of a cartridge which is easily and quickly inserted in and removed from the apparatus. A feature of the invention is that tape for carrying reels of the cartridge are automatically locked when the cartridge is removed from the tape recorder and are unlocked when it is inserted.

A further object of the invention is that despite the small size of the tape recorder, the recording capacity of the tape of each cartridge is exceptionally large so that a relatively long recording can be made without changing the cartridge.

Other objects and advantages of the invention will appear from the following description and claims in conjunction with the accompanying drawings which show by way of example preferred embodiments of the invention.

*In the drawings*

Figure 1:
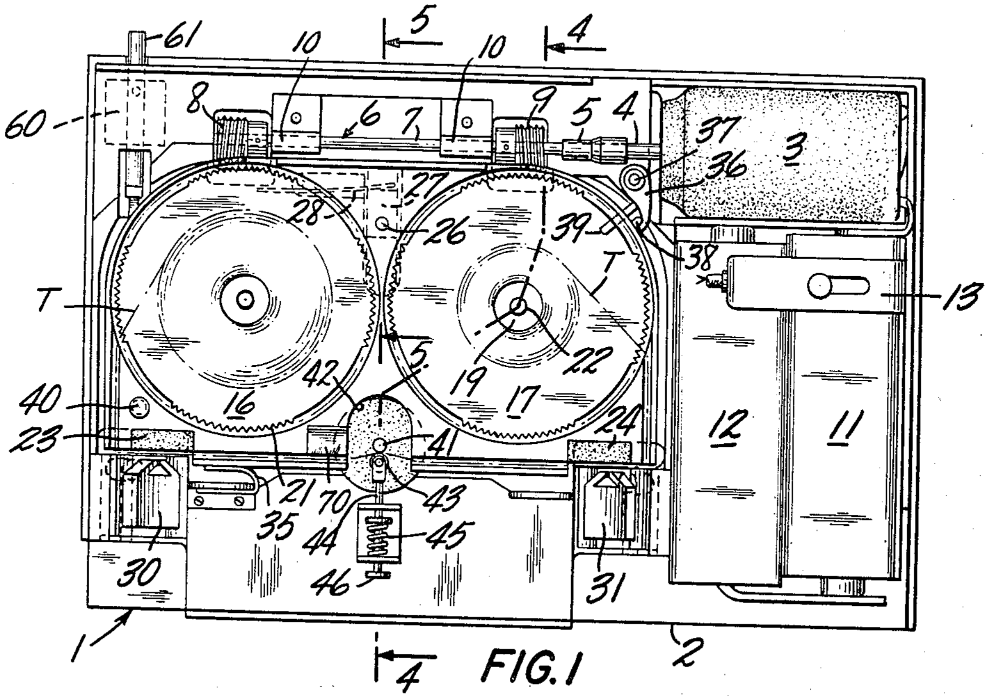
FIGURE 1 is a plan view of a tape recorder in accordance with the invention.
Figure 2:
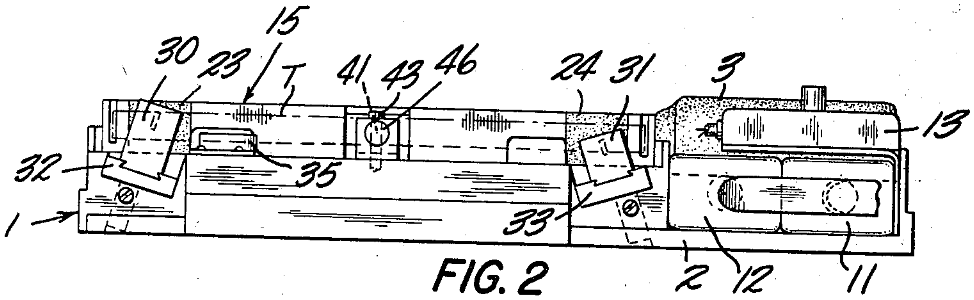
FIGURES 2 and 3 are front and rear views respecfully of the tape recorder shown in FIGURE 1.
Figure 3:
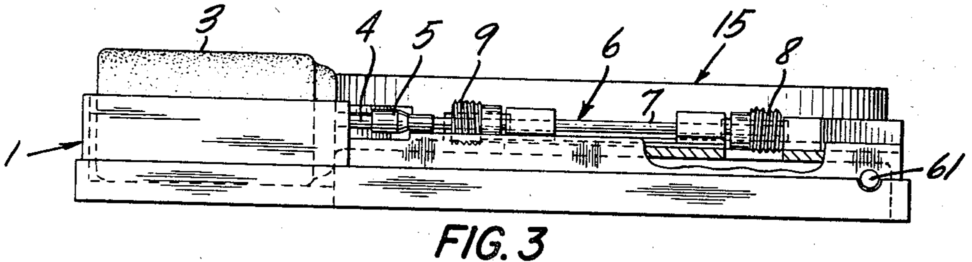

The tape recorder shown by way of example in the drawings, comprises a chassis 1 including a base portion 2 which may be suitably moulded of plastic material and on which various portions of the tape recorders are mounted. A motor 3 mounted on the chassis has a drive shaft 4 connected by means of a flexible coupling 5 with a driving member 6 comprising a shaft 7 on which worm drive gears 8 and 9 are mounted. The shaft 7 is rotatably mounted on the chassis by bearings 10. The flexible coupling 5 is illustrated as comprising a short length of rubber tubing slipped on adjacent ends of the motor drive shaft 4 and driving shaft 7. Electric power for the motor 5 is supplied through a circuit which is shown by way of example in FIGURE 8 and described below. The circuit includes batteries 11 and 12 and a manual switch 13 which may be closed to start the tape recorder.

The chassis 1 is adapted to receive a removable tape cartridge 15 comprising two reels 16 and 17 rotatably mounted on a base portion 18. Each of the reels has a hub portion 19 and at least one radially extending flange portion 20 which is shown as being provided at its rim with small gear teeth 21. Each reel is rotatably mounted by a bearing pin 22 which extends up from the base 18 and is received in a central hole in the hub portion 19 of the reel. It will be noted that the hubs 19 are of relatively small diameter being for example, about ⅕ of the diameter of the flange portion 20. A tape T is wound on the hub portions of the reels 16 and 17. In passing from one reel to the other, the tape T runs over pressure pads 23 and 24 which are mounted on the base portion of the cartridge and are formed of felt or other relatively soft resilient material. The tape T is preferably formed of Mylar or other suitable film material or strip material which is strong, durable, flexible and dimensionally stable. By way of example, the tape may be a strip ⅛ inch wide and .0005 inch thick.

Means is provided for movably mounting the cartridge 15 on the chassis 1 in such manner that either of the reels 16, 17 may be brought selectively into driven connection with the driving member 6. As illustrated in the drawings, a pivot pin 26 provided on the chassis approximately midway between the worm drive gears 8 and 9, but offset laterally from the drive shaft 7, is received in a corresponding pivot hole in the base portion 18 of the cartridge. The pivotal mounting of the cartridge thus provided permits movement of the cartridge between the position shown in FIGURE 6A in which the rim of reel 17 is in driven engagement with the worm drive gear 9 and the position shown in FIGURE 6B in which the rim of reel 16 is in driven engagement with the worm drive gear 8. Engagement of the worm drive wheels 8 and 9 with the small gear teeth 21 on the rims of the respective reels provides a positive drive. The direction of drive is such that the tape is wound onto the driven reel and drawn off of the reel which is disengaged from the corresponding worm drive gear.

Figure 4:
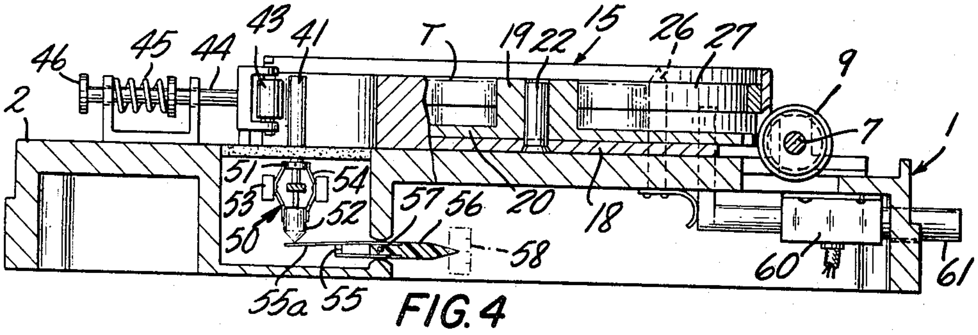
FIGURE 4 is a cross-section taken approximately on the line 4—4 in FIGURE 1.
Figure 5:
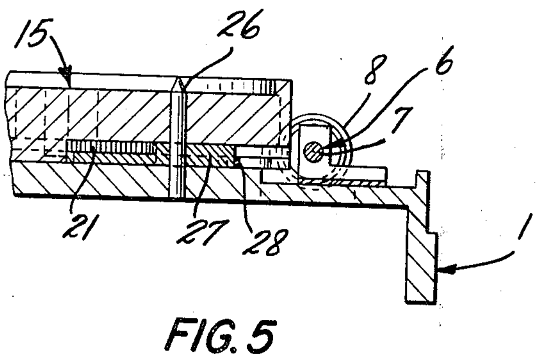
FIGURE 5 is a partial cross-section taken approximately on the line 5—5 in FIGURE 1.

Means is preferably provided on the cartridge 15 for locking the two reels 16 and 17 against rotation when the cartridge is removed from the tape recorder. As illustrated particularly in FIGURES 1, 4 and 5, the locking means comprises a latch member 27 which is slidably mounted on the base member 18 between the two reels 16 and 17. A spring 28 resiliently presses the latch member 26 in a direction toward the reels to a locking position in which corners of the latch member engage the gear teeth 21 on the rims of both reels. The latch member 27 is provided with a small hole which is approximately the same size as the hole provided in the base 18 to receive the pivot pin 26. When the latch member 27 is in locking position, the hole in the latch member partially coincides with that in the base member 18 but is slightly offset, being closer to a line connecting the axes of the two reels. As seen in FIGURE 5, the pivot pin 26 has an upper tapered end. When the cartridge 15 is inserted in the tape recorder, the tapered end of the pivot pin 26 engages the edge of the hole provided in the latch member 27 and cams the latch member away from the reels so that the hole in the latch member is concentric with that in the base member 18. The latch member 27 is thereby withdrawn from engagement with the rims of the reels. Hence, the reels are locked against rotation when the cartridge is removed from the tape recorder, but are automatically released when the cartridge is put into the tape recorder.

Figure 6A:
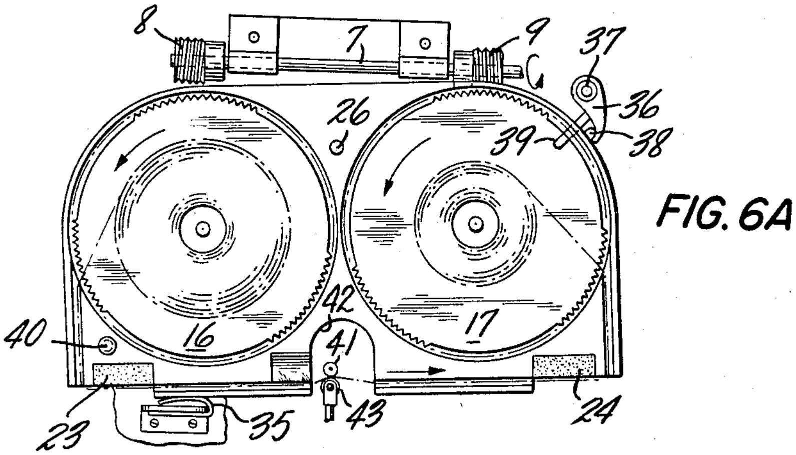
FIGURES 6A and 6B are partial plan views of the tape recorder shown in FIGURE 1 with the tape cartridge in different operative positions.
Figure 6B:
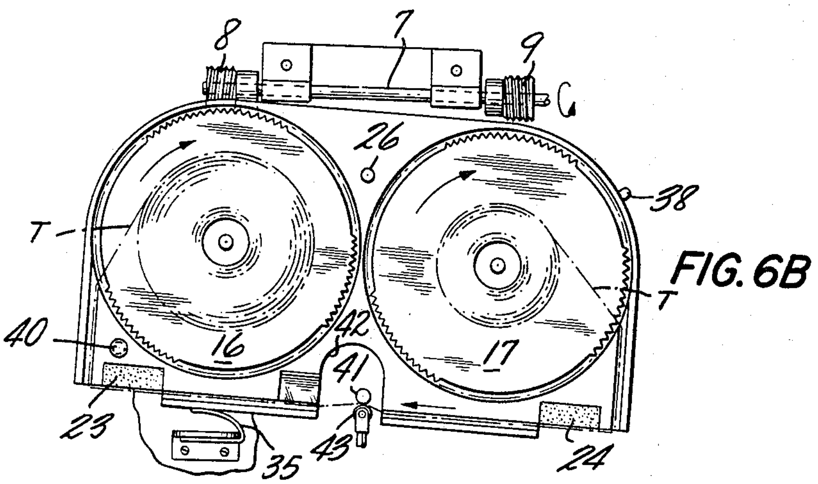
Figure 7A:
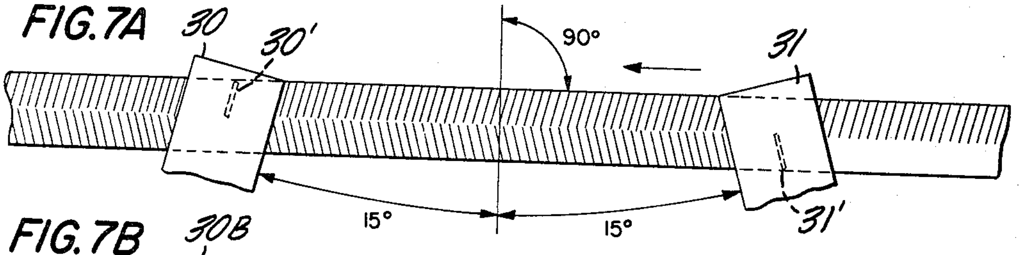
FIGURES 7A, 7B and 7C illustrates several arrangements of pick-up heads.

Transducing means is provided for recording a signal on tape as it runs from one reel to the other and for reproducing a signal from the tape. The transducing is shown by way of example in the drawings as comprising two magnetic heads 30 and 31 removably and adjustably mounted by means of support members 32 and 33. The heads 30 and 31 are mounted on the chassis in such position that when the reel 17 is in driven engagement with the worm drive wheel 9 as shown in FIGURE 6A, pressure pad 23 presses the tape into engagement with the gap-defining portion of head 30. When the cartridge is pivoted to the position shown in FIGURE 6B with reel 16 in driven engagement with worm drive wheel 8, the other pressure pad 24 presses the tape into engagement with the gap-defining portion of the head 31. The arrangement of the heads is illustrated schematically in FIGURE 7A where it will be seen that the gap 30' of the head 30 and gap 31' and head 31 are inclined in opposite directions at an angle which should be between 10° and 30° and is shown as 15° to a line perpendicular to the direction of movement of the tape. Moreover, each of the gaps extends only approximately halfway across the width of the tape, the gap 30' and head 30 being located in position to engage the upper half of the tape while the gap 31' of head 31 engages the lower half. Hence, a recording is made on one half the width of the tape when the tape is running in one direction and on the other half of the width of the tape when the tape is running in the opposite direction. Moreover, by turning the cartridge over in the tape recorder, it is possible to make two additional recordings, one in one direction and the other in the opposite direction. When the reels are to be turned over, they have flanges 20 on both sides. By reason of the inclination of the recording heads, the magnetic lines of one recording are disposed at a substantial angle to the magnetic lines of the preceding or subsequent recording so that one recording does not interfere with the other in reproduction. With the heads inclined at an angle of 15° as illustrated in FIGURE 7A, the total angle between the lines of one recording and one of a subsequent recording is 30°. Hence, even on a relatively narrow tape having a width for example ⅛ inch, it is possible to make four recordings.

Figure 7B:
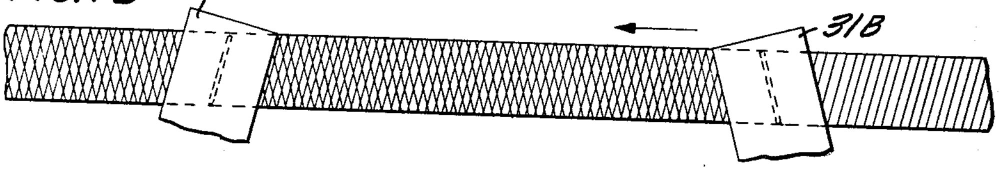
Figure 7C:
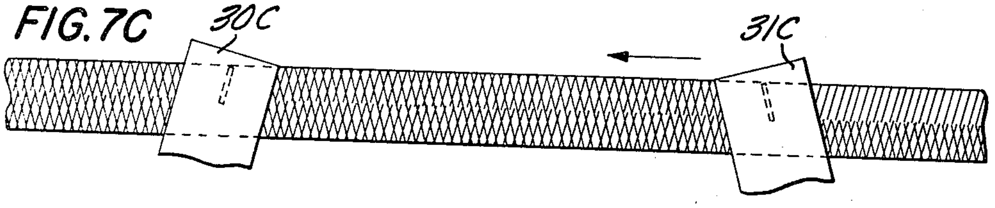

FIGURES 7B and 7C illustrate other possible arrangements of the recording heads. It will be seen that in FIGURE 7B, the magnetic gaps of heads 30B and 31B each extend entirely across the width of the tape. In FIGURE 7C, the gaps of the heads 30C and 31C extend only halfway across the tape, but are both disposed to engage the same half. By reason of the angular relationship of the two heads, the recording by one head does not interfere with the recording by the other. When the cartridge is turned over, a recording by each of the heads can be made on the other half of the tape. Hence, as with the arrangement of FIGURE 7A, it is possible to make four recordings on one tape.

Means is provided for holding the cartridge 15 in either operative position as selected. As illustrated schematically by way of example in FIGURES 6A and 6B, a small leaf spring 35 acting between the chassis and the cartridge tends to move the cartridge to the position shown in FIGURE 6B in which the reel 16 is in driven engagement with the worm drive wheel 8. A small latch member 36 pivotally mounted on the chassis at 37 is engageable with a detent 38 on the cartridge to hold the cartridge in the position shown in FIGURE 6A with the reel 17 in driven engagement with the worm drive wheel 9. A small projection or pin 39 extends inwardly from the latch 36 so that its inner end is disposed inwardly of the outer periphery of the rim of the reel. When substantially all of the tape has been wound onto the reel 17, the radius of the roll of tape on the reel increases to the point where the tape roll engages the pin 39 and pushes the pin radially outwardly to disengage the latch 36 from the detent 38. The cartridge is thereby released for movement by the spring 35 to the position shown in FIGURE 6B so that reel 16 is then driven by the worm drive gear 8 to wind tape from reel 17 to reel 16. Moreover, the pivotal movement of the cartridge disengages the tape from the recording head 30 and brings it into engagement with head 31 thereby in effect switching heads. As explained above in connection with FIGURES 7A, 7B and 7C, this results in the recording being made either on a different portion of the tape or at a different angle when the tape is run in the reversed direction.

In addition to or instead of the automatic latch means just described, the tape recorder may be provided with manual means for holding the cartridge in selected operative position. By way of example in the drawings (FIGS. 1, 6A and 6B) such manual means is illustrated as a small pin 40 which is axially slidable in a corresponding hole in the cartridge and is engageable with one or the other of holes provided in the chassis beneath the cartridge corresponding to the operative positions of the cartridge. Thus, pin 40 may be pulled out to release the cartridge or may be pushed in to engage one or another hole in the chassis and thereby hold the cartridge in selected position.

Since the tape is transported by driving one or another of the reels and since the effective radius of the reel varies in accordance with how much tape is wound on the reel, it is necessary variably to control the speed at which the respective reel is driven in order to maintain substantially constant lineal speed of the tape past the recording head. In accordance with the invention, there is provided means for sensing the lineal speed of the tape and controlling the speed of the motor 3 to provide constant tape speed of the desired value. As illustrated by way of example in the drawings, the sensing means includes a rotatable capstan 41 disposed on the chassis between the two heads 30 and 31 and accommodated in a cutout portion 42 of the cartridge. A pressure roller 43 carried by a slidable stem 44 is pressed toward the capstan 41 by a spring 45. The tape runs between the capstan and the pressure roller and the roller presses the tape into engagement with the capstan so that the capstan is driven by the tape. A knob 46 is provided on the stem for withdrawing the roller when a cartridge is placed on the chassis.

The speed of the motor 3 is controlled by a speed sensing device driven by the capstan 41. The speed sensing device is illustrated by way of example as a ball-type governor 50 mounted on a downward extension of the capstan 41. The governor is shown as comprising a disc 51 which is fixed on the capstan 41, a second disc 52 which is slidable on the capstan and a plurality of weights 53 mounted on springs 54 extending between the two discs. When the speed of the capstan increases, the weights 53 are thrown outwardly by centrifugal force causing the lower disc 52 to be moved upwardly by the springs 54. The position of the lower disc 52 is thus responsive to the speed at which the capstan is driven by the tape. Movement of the lower disc 52 of the governor is utilized to control the speed of the motor 3. While a resistance or other suitable motor speed controlling device may be used, a relatively simple control circuit is illustrated by way of example in FIGURE 8. The circuit includes spring contacts 55 mounted on an insulating member 56 pivotally mounted on the chassis at 57 and having a pointer portion co-operating with a scale 58. The contacts 55 are connected in series with the motor so that when the contacts are closed, power is supplied to the motor from the battery 12. An extension **55*a* on one of the contacts is engageable by the movable member 52 of the governor. When the governor is stationary or is driven by the tape at a speed not exceeding a predetermined speed, engagement of the governor member 52 with the contact extension 55*a* holds the contacts closed and thereby supplies power to the motor. When the governor is driven by the tape at a speed exceeding a predetermined speed, upward movement of the governor member 52 permits the contacts to open so that the motor is deenergized and slows down. The weights 53 of the governor act as a flywheel on the capstan 41 and hence assist in maintaining the rotational speed of the capstan and hence the transitional speed of the tape substantially constant. The member 56 is adjusted about its pivot 57 to its selected speed at which it is desired to move the tape. The scale 55** is preferably calibrated in terms of tape speed. For example, at the setting shown in FIGURE 8, the tape is moved at the rate of 1¼ inches per second.

Figure 8:
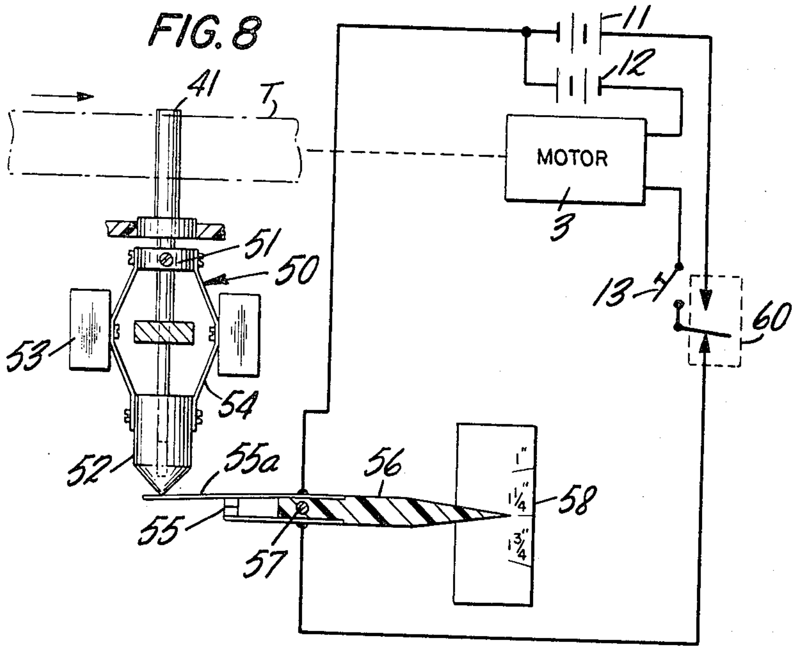
FIGURE 8 is a diagrammatic view of speed control means for the tape recorder including a governor and motor circuit.

The circuit shown in FIGURE 8 also includes the above-mentioned manual switch 13 for turning the tape recorder on and off and a double throw switch 60 providing for a rapid rewind of the tape. When the switch 60 is in the position shown, the motor 3 is operated under control of the governor as described above. When the switch 60 is moved to the opposite position, the contacts 55 controlled by the governor are cut out of the circuit and the two batteries 11 and 12 are connected in series to provide a higher voltage to the motor 3, thereby increasing its speed. As the battery 11 is connected in the motor circuit only during fast rewind, it is also used to supply power for the audio-recording and reproducing circuits which may be of conventional or desired design and are hence not shown. As illustrated in FIGURE 1, the single pole double throw switch 60 is preferably combined with a push-button 61 for moving the cartridge 15 from the driving position shown in FIGURE 6B in which it is held by the spring 35, to the position shown in FIGURE 6A. When the button 61 is released, reel 16 is in driven engagement with the worm drive gear 8 and the double throw switch 60 is in the position shown in FIGURE 8 so that the speed of the tape is controlled by the governor 50. When the push-button 61 is manually pushed in, its inner end engages the cartridge to swing it about its pivot in a counterclockwise direction to bring reel 17 into driving engagement with the worm drive gear 9 and thereby reverse the direction of the tape. The inward movement of the push-button 61 also moves the double throw switch 60 to its opposite position so that the governor control is cut out of the motor circuit and battery 11 is connected in series with battery 12 so as to provide higher motor speed.

Figure 9:
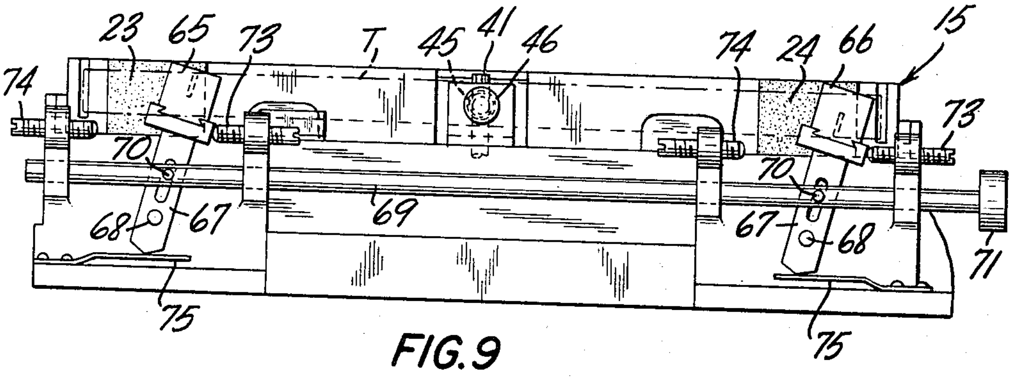
FIGURE 9 is a view similar to FIGURE 2, but shows a modification.

FIGURE 9 illustrates a different mounting of the recording and pick-up heads which makes it possible to make four recordings on a narrow tape without the need of reversing the cartridge. Heads 65 and 66 are mounted on carriers 67 pivoted on the chassis at 68. A longitudinally slidable rod 69 is pivotally connected at 70 to each of the carriers 67 and is provided at one end with a push-button or handle 71. Movements of each of the heads in one direction is limited by an adjustable stop 73 while movement in the opposite direction is limited by an adjustable stop 74. The stops 73 and 74 are set so that the magnetic gaps of the heads are inclined at a selected angle, for example at an angle of 15°, to a line perpendicular to the direction of movement of the tape T. The gap of head 65 is positioned so as to engage the upper half of the tape while the gap of head 66 is positioned so as to engage the lower half of the tape. A spring 75 is engageable with the lower end of each of the carriers 67 so as to hold the heads in whichever position is selected.

With the heads in the position shown in FIGURE 9, the tape is wound from reel 16 onto reel 17 while recording on the upper half of the tape with head 65. The cartridge is then moved to a position shown in FIGURE 6B so as to wind the tape from reel 17 to reel 16 while recording on the lower half of the tape with head 66. When the recording is completed, the push-button 71 is pushed inwardly so as to swing both heads to the opposite position in which the carriers 67 engage the abutments 74. The cartridge is moved back to the position shown in FIGURE 6A and a further recording is made on the upper half of the tape with head 65. Since the angle of the head has been displaced, this recording does not erase or interfere with the first recording made. When the tape has been wound onto reel 17, the cartridge is moved to the position shown in FIGURE 6B and a further recording is made on the lower half of the tape by the recording head 66. Here again, the different angle of the head makes it possible to superimpose a fourth recording over the second recording previously made. It is thus possible to make four recordings even on a narrow tape for example, one having a width of ⅛ inch.

In FIG. 1, there is illustrated means for indicating the lengthwise position of the tape. On the rear face of the tape, there are printed or otherwise applied numbers or other indicia which are visible through suitable viewing means illustrated as an inclined mirror 70. Preferably the indicia on the tape are quite close together so that one can be seen in the mirror at all times or with only slight movement of the tape. For example, starting at one end, the numeral "1" can be printed at close intervals throughout the first foot of tape, etc. Thus, when making a recording, a person using the recorder will always know how much tape has been used. Moreover, when several items have been recorded on a tape, any desired item can readily be located and played back.

While preferred embodiments of the invention have been illustrated by way of example in the drawings and particularly described, it will be understood that the invention is in no way limited to these embodiments. It will be seen that the construction in accordance with the invention provides a tape recorder which is of small size and lightweight, while at the same time, providing a relatively large capacity for recording material.

What is claimed is:

1. In a tape recorder, a chassis, a motor on said chassis and having a toothed driving member, a cartridge comprising a pair of tape-carrying reels and means rotatably supporting said reels, each of said reels having a toothed rim, means removably and including means movably mounting said cartridge on said chassis for movement to a first driving position in which said toothed driving member is in driving engagement with the toothed rim of one of said reels and to a second driving position in which said driving member is in driving engagement with the rim of the other of said reels to wind tape from one reel to the other, means for sensing the lineal speed of the tape and means responsive to said sensing means for controlling the speed of said motor to drive the reel engaging said driving means at an angular speed to provide a selected lineal tape speed.

2. A tape recorder according to claim 1, further comprising resilient means biasing said cartridge to one of said driving positions and releasable latch means for retaining said cartridge in the other of said driving positions against the action of said resilient means.

3. A tape recorder according to claim 2, further comprising means for sensing the amount of tape on one of said reels and means operatively connecting said tape sensing means with said latch means to release said latch means when a predetermined amount of tape has been wound on said one reel.

References Cited

UNITED STATES PATENTS

| | | | |
|---|---|---|---|
| 1,982,461 | 11/1934 | Winther | 226—188 |
| 2,681,950 | 6/1954 | Owens | 179—100.2 X |
| 2,686,845 | 8/1954 | Reed et al. | 179—100.2 |
| 2,712,572 | 7/1955 | Roberts | 179—100.2 |
| 2,764,639 | 9/1956 | Holt | 179—100.2 |
| 2,783,303 | 2/1957 | Fontaine et al. | 179—6 |
| 2,821,576 | 1/1958 | Gaubert | 179—100.2 |
| 2,929,670 | 3/1960 | Garrity | 179—100.2 |
| 3,107,279 | 10/1963 | Hanes et al. | 179—100.2 |
| 3,166,328 | 1/1965 | Roberts | 179—100.2 |

BERNARD KONICK, *Primary Examiner.*

J. R. GOUDEAU, *Assistant Examiner.*